Figure 1:
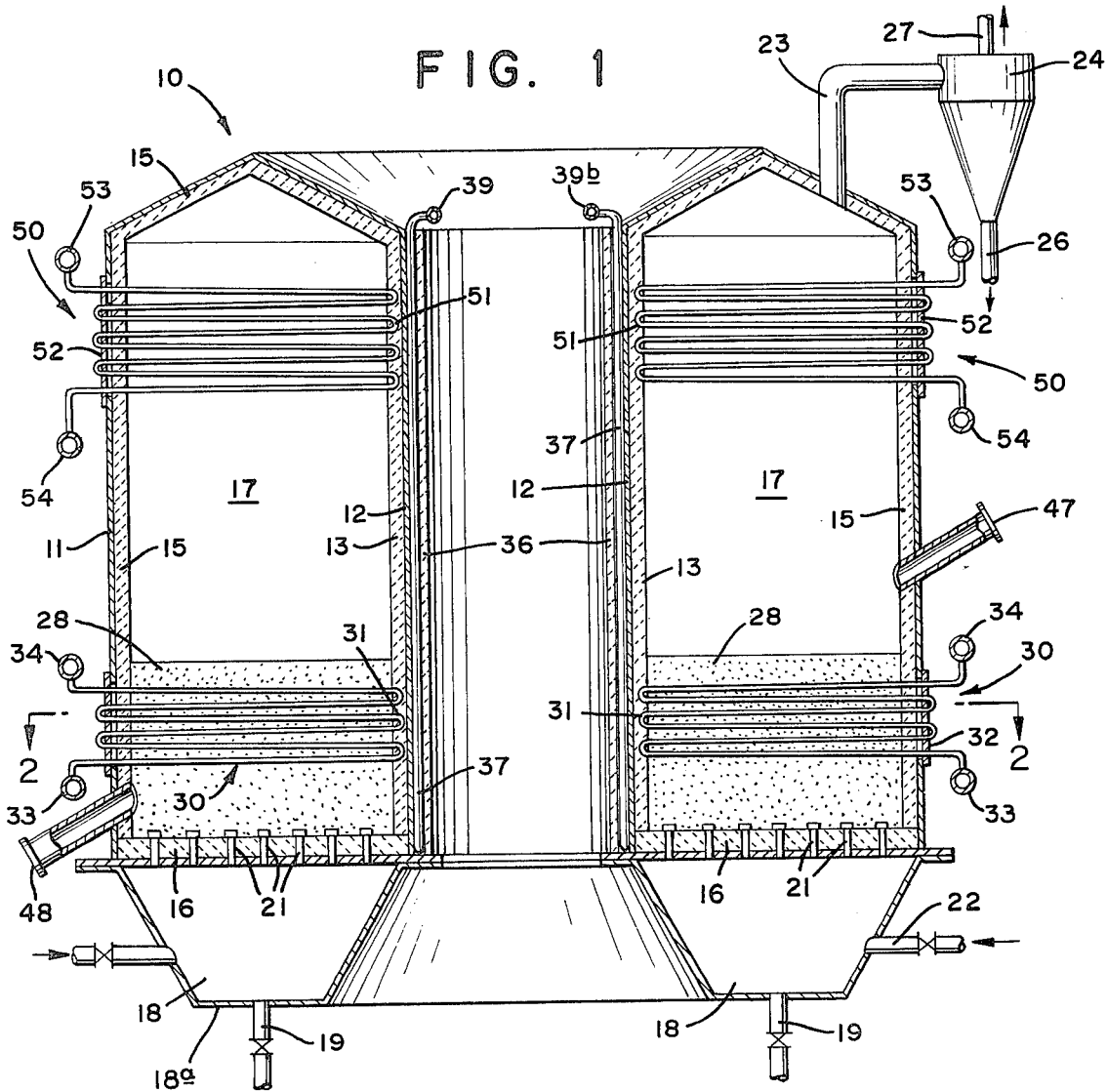

United States Patent [19]

Jukkola

[11] 4,096,909
[45] Jun. 27, 1978

[54] FLUIDIZED BED PROCESS HEATER

[75] Inventor: Walfred Wilhelm Jukkola, Westport, Conn.

[73] Assignee: Dorr-Oliver Incorporated, Stamford, Conn.

[21] Appl. No.: 754,063

[22] Filed: Dec. 23, 1976

[51] Int. Cl.² .................................. F28D 13/00
[52] U.S. Cl. .......................... 165/76; 165/104 F; 165/163; 122/4 D
[58] Field of Search .............. 165/104 F, 163, 162, 165/76; 122/4 D; 34/57 A; 110/28 J

[56] References Cited

U.S. PATENT DOCUMENTS

| | | | |
|---|---|---|---|
| 2,013,309 | 9/1935 | Jackson | 165/163 X |
| 2,699,375 | 1/1955 | Johannsen et al. | 165/104 F X |
| 2,818,049 | 12/1957 | Blaskowski et al. | 122/4 D X |
| 2,914,388 | 11/1959 | Kelley | 165/104 F X |
| 3,898,043 | 8/1975 | Schutte et al. | 165/104 F X |
| 3,982,901 | 9/1976 | Steever et al. | 122/4 D X |

FOREIGN PATENT DOCUMENTS

| | | | |
|---|---|---|---|
| 2,511,944 | 9/1975 | Germany | 165/104 F |
| 148,551 | 1/1955 | Sweden | 165/104 F |

Primary Examiner—Albert W. Davis, Jr.
Attorney, Agent, or Firm—Burtsell J. Kearns; Harold M. Snyder

[57] ABSTRACT

A fluidized bed process heater with a reaction chamber of toroidal configuration is provided with radially-oriented bed coils in the reaction chamber in which steam is generated or other process fluids are heated. The inner wall of the toroidal reaction chamber is water-cooled and the bed coils in the reaction chamber are removable. The return bends of the coils are protected against erosion from particulate bed solids.

11 Claims, 4 Drawing Figures

U.S. Patent June 27, 1978 Sheet 1 of 2 4,096,909

FLUIDIZED BED PROCESS HEATER

This invention is directed to a novel structure for a fluidized bed process heater for use in oil refineries, chemical plants and other industrial applications where steam is required, or other process fluids, such as oils, must be heated.

Fluidized bed reactors typically comprise a cylindrical vessel having a substantially horizontal perforate plate which supports a bed of finely divided solids in the reaction chamber and separates the reaction chamber from a windbox below the plate. Air and/or other gases are introduced into the windbox and passed through the perforate plate (constriction plate) in sufficient volume to achieve a gas velocity that expands the solids bed, suspending the fine particulate solids of the bed and imparting to the individual particles a continuous random motion. This expanded bed has many of the properties of fluids and so is termed a "fluidized bed".

In such fluidized bed reactors, the processes of drying, sizing, roasting, calcining, incinerating and heat treatment of solids with gases in the chemical, metallurgical and other materials processing fields, can be carried out. Further, the reaction chambers of such fluidized bed reactors, where combustion reactions are taking place, can be provided with coils for heat exchange with the fluidized bed for production of steam or other hot process fluids for electric power generation or for carrying out chemical or physical processes where heat is required.

Where it is desired to extract heat from a fluidized bed by circulating a liquid or gas through coils located in the bed, there are certain problems with such installations which must be considered. An obvious problem is the rather severe erosive conditions in the fluidized bed as the result of the rapid and continuous motion of the particulate bed solids, since such solids may comprise sand, coal, alumina or other hard and abrasive substances. The return bends of bed coils are especially sensitive to such erosive conditions due to turbulence prevalent at these locations. The elevated temperature within the reaction chamber must be considered in the matter of providing adequate support for the coils, particularly as increased capacity is demanded of new units leading to larger and larger diameter reaction chambers which horizontal coils must span. Further, since horizontal coils must be located on chords of the circular cross-section of the reaction chamber, the lengths of the coils cannot be standardized and proper maintenance requires either a large store of coils of various sizes or provision for special fabrication thereof. Vertical coils are sometimes used, but providing a high density of heat exchange surface involves congestion of the windbox and/or freeboard of the reactor with the necessary header structure.

In accordance with this invention, a novel fluidized bed process heater structure has been provided wherein horizontally oriented heat exchange coils of a uniform size may be employed and wherein the heat exchange coils are well supported by the walls of the structure.

It is an object of this invention to provide a fluidized bed process heater wherein a high density of heat exchanger surface may be realized.

It is another object of this invention to provide, in a fluidized bed process heater having a large bed surface area, means for adequately supporting horizontal heat exchanger coils located within the bed.

It is a further object of this invention to provide, in a fluidized bed process heater comprising horizontal heat exchanger coils located within a fluidized bed, structural means for protecting the return bends of the coils from the highly erosive conditions prevailing in the bed.

Still another object of the invention is to provide, in a fluidized bed reactor of toroidal configuration, means for assuring the structural integrity of the inner wall of the reactor during operation at elevated temperatures.

Figure 3:
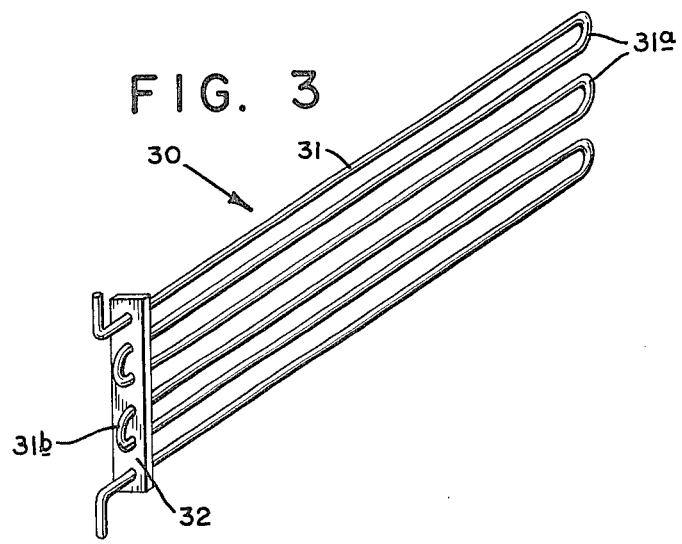
Figure 2:
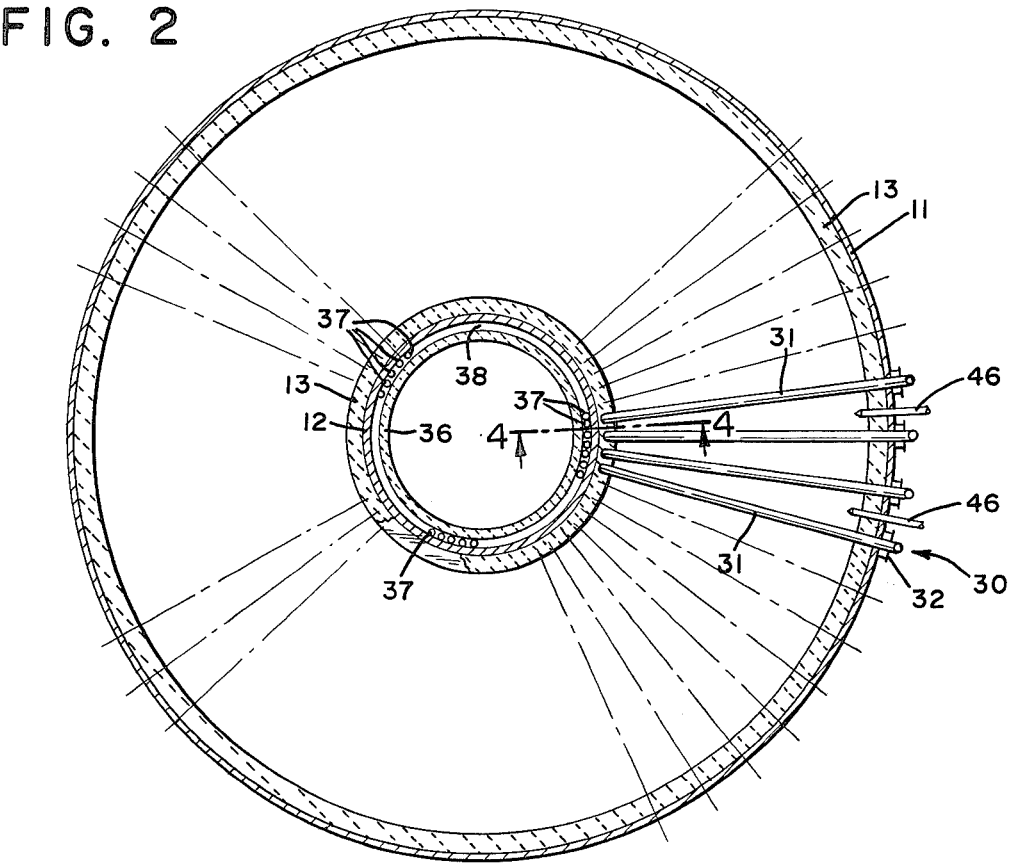
Figure 4:
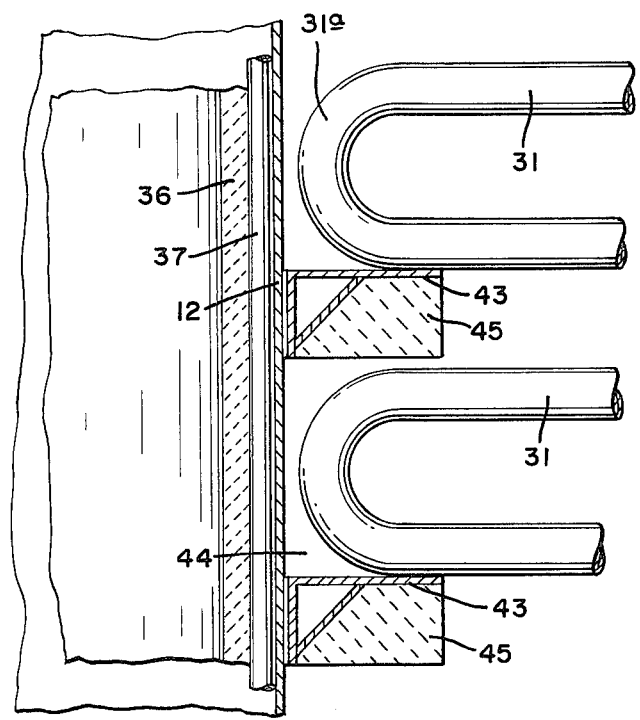

Other objects and advantages will become apparent from the following description taken in conjunction with the accompanying drawings in which:

FIG. 1 is a view, partially in section, of the toroidal-type fluidized bed process heater of the present invention, FIG. 2 is a view in section of the process heater of the invention, taken generally along line 2—2 of FIG. 1, FIG. 3 is a view in perspective of one heat exchanger coil unit in accordance with this invention and FIG. 4 is a fragmental view, partially in section, showing support structure for heat exchanger coils in accordance with this invention.

The term "toroidal" as used in the description of this invention is intended to include structures having a generally doughnut-like configuration with an outer circular wall and a concentric inner wall. The cross-section of the structure taken along a radius may be polygonal or a closed plane curve.

Generally speaking, the fluidized bed process heater of this invention comprises a toroidal reactor vessel having an outer wall and a concentric water-cooled inner wall of smaller diameter. In the ring volume formed by the inner and outer walls is positioned the reaction chamber in which a fluidized bed is situated. Vertically oriented planar coil units formed of horizontal runs of tubing are positioned on radii of the reactor structure and are supported by the outer and inner walls.

More specifically, the coil units are assembled with a hatch which can be secured to the outer wall of the reactor structure. The horizontal runs of tubing pass through the hatch and the return bends of the coil units are located so that they are outside the outer reactor wall when in assembled position. The inner return bends of the coil units are received in support recesses in the inner wall of the reactor structure. Within the inner wall, vertically oriented cooling tubes are provided.

Referring now to the drawings, in FIGS. 1 and 2 there is illustrated a fluidized bed process heater 10 of toroidal configuration which incorporates vertically disposed coil units 30 arranged within the heater chamber 17 in accordance with this invention. Fluidized bed process heater 10 has a metal outer wall 11 of relatively large diameter, which is provided with a refractory lining 15, and a metal inner wall 12 of substantially smaller diameter provided with its own refractory lining 13. An annular refractory-lined roof member 15 spans the upper ends of walls 11 and 12. The bottom ends of walls 11 and 12 are spanned by an annular metal bottom wall member 18a which defines the windbox 18. The windbox 18 is separated from the heater chamber 17 by the annular constriction plate 16 which is provided with a plurality of tuyeres 21. A bed of particulate solids 28 is supported by the constriction plate 16. An air inlet conduit 22 communicates with the windbox 18 and an exhaust gas outlet 23 communicates with the heater chamber 17. Solids inlet conduit 47 communicates with the heater chamber 17, as does solids withdrawal conduit 48. A cleaning port 19 is provided in communication with windbox 18. Coil units 30 span the ring-line heater chamber 17 on the radii of the process heater structure and within the fluidized bed 28. Fuel guns 46 (FIG. 2) pass through the outer reactor wall and are positioned to discharge fuel between the coil units 30. As best seen in FIG. 3, coil unit 30 comprises a coil hatch member 32 formed of a metal plate lined with refractory material in which the outer end of serpentine coil 31 is mounted. When assembled, the hatch member 32 is secured to the outer wall 11 of the process heater by bolts or other suitable means (not illustrated) and provides support for the outer end of coil 31. The outer return bends 31b of the coil are thus located outside the outer wall 11 of the process heater. The inner return bends 31a of the coil 31 are supported on metal coil support rings 43 in the recesses 44 provided in the refractory inner wall 13 of the process heater. The support rings 43 surround the inner wall 12 of the process heater at appropriate elevations to fulfill their support function. A protective refractory element 45 is provided in contact with the lower surface of the coil support ring 43.

Inlet header 33 and outlet header 34 externally encircle outer wall 11 of process heater 10 in the region of the fluidized bed. The serpentine coils 31 are each connected to the headers 33 and 34.

The coil units 30, just described, extend through the fluidized bed 28. It may also be desirable to position coil units 50 in the freeboard region of the heater chamber 17 to extract additional heat from the reactor. Coil units 50 are entirely similar to coil units 30 with coil units 51 assembled with coil hatch members 52 and the unit bolted or otherwise secured to the outer wall 11 of process heater 10.

Cooling steam coils 37 are provided in contact with the inner wall 12 of the process heater 10. Coils 37 are confined in the annular space 38 (best seen in FIG. 2) between wall 12 and blanket insulation 36 and are connected to inlet 39 and outlet 39b.

The process heater of this invention is adapted to operate at either atmospheric or under pressurized conditions. In operation of the process heater, fuel is introduced through the fuel guns. Fuels such as coal, petroleum coke or low grade coal are entirely suitable for this process, but other fuels such as "Bunker C" oil may be employed. Injection air may be introduced with the fuel through fuel guns 46 either as a fuel carrier for solid fuels, such as coal, or to improve fuel dispersion where liquid fuel is employed. Fluidizing gases, which may be at an elevated temperature, are introduced through inlet conduit 22. The gas passing through inlet conduit 22 traverses the constriction plate 16 through the tuyeres 21 to fluidize the particulate solids within the heater chamber 17. The particulate solids bed may be composed of particles of sand, alumina, limestone or dolomite, for example. The combustion gases generated in the bed 28 move through the bed, contacting the coil units 30 and then into the freeboard region of the heater chamber 17 where coil units 50 are contacted, if such freeboard coils have been provided. From the freeboard space the gases are conducted away through the exhaust gas outlet 23 to the cyclone 24 which separates entrained solids from the gas, with the solids disposed of through conduit 26 and the gas exiting through conduit 27 for further treatment and/or disposal. The process fluid, which may be steam, oil, or air, for example, is introduced into the heater chamber 17 by means of inlet header 34 which is connected to coil unit 30. In passing through the coil unit 30, the fluid is in heat exchange relationship with the fluidized bed 28. The heated fluid passes to outlet header 33 from which it is conducted away to apparatus (not shown) for heat recovery, power generation or for other purposes. The coil units 50 in the freeboard region of the heater chamber 17 operate in a similar fashion. The character of the bed may be maintained by introducing particulate bed solids through solids inlet 47, as required, and withdrawing bed material, including ash, through solids outlet 48.

The hatch 32 on which the coil 31 is mounted provides good support for the coil at the outer wall 11 of the process heater 10. In addition, the arrangement is such as to locate the outer return bends 31b of coil unit 30 outside the heater chamber 17. These outer return bends, which are so susceptible to erosion, are thus removed from the erosive environment. At the inner wall 12 of the heater chamber 17, the inner return bends 31a of coil unit 30 are supported on ring members 43 and sheltered in recesses 44 in the refractory lining 13 of the inner wall from active bed motion. Thus, inner return bends 31a are shielded in substantial measure from the erosive conditions within the heater chamber 17 and, at the same time, are well supported.

The water wall construction of inner wall 12 is important for maintaining the structural integrity of this inner wall. It is generally difficult to maintain sound refractory wall construction on an outward curving wall where the convex surface of the wall is to be subjected to elevated temperatures, even with use of numerous clips and castable construction. The steam coils 37 will protect the inner wall against excessive heat in the event of refractory wall failure and will also keep the inner wall 12 above the acid dewpoint and thereby protect it against corrosion.

The coil units are removable to permit required maintenance. A layer of castable refractory may be applied to the hatch to protect it from excessive heat. While the return bends are shown as passing through the hatch, adequate support may be provided by the hatch without passing entirely therethrough by providing clips or other mechanical mounting means on the hatch. While one set of serpentine coils is illustrated for each hatch, it is possible to provide two such sets spaced apart by perhaps 4 inches. Such an assembly would be considered a single coil unit for the purposes of this description. The spacing of the coils at the inner wall 12 determines the number of coil units that can be installed in a process heater of the type described.

The freeboard coils 51 have been illustrated as being removable, however, if the coils are installed at an adequate distance above the bed so that they are above the splash zone, abrasion will be minimal, and the removable feature will not be essential for these freeboard coils.

In an exemplary process heater in accordance with this invention, the inner wall has a diameter of 12 feet. The outer wall has an inside diameter of 45 feet which provides a bed annulus approximately 15 feet-6 inches wide. Coil units formed of six 4 inches O.D. tubes provide a heat transfer area of about 100 square feet per unit. Fifty-six such units are installed in the process heater. With an overall heat transfer coefficient of 60 btu/sq. ft., hr., °F and a temperature differential of 1000° F between the fluidized bed and the average fluid temperature, the heat transfer from the fluid bed to the process liquid in the bed coils is about 324 × 10⁶ btu/hr.

The bed heat transfer can be increased by increasing the number of tubes per coil unit (which may require a deeper bed) and/or by closer spacing of the coil units.

Further, the bed heat transfer can be increased to 420 × 10⁶ btu/hr. by using a process heater having a diameter of about 52 feet which would give an annulus width of about 20 feet.

Where coal is the fuel employed, the solids separated in cyclone 24, particularly coal fines, may be returned to the fluidized bed for combustion by extending conduit 26 to discharge into fluidized bed 28 between adjacent coil units 30.

The process heater of this invention has the advantage that the inner wall construction can be standardized and factory assembled with units of various capacities being provided merely by changing the width of the annulus and the length of the bed coils. In each process heater, the bed coils are removable, of identical design and, hence, interchangeable. The water wall construction protects the inner wall against excessive heat resulting from refractory failure and against acid corrosion.

Although the present invention has been described with particular reference to preferred embodiments, it will be apparent to those skilled in the art that variations and modifications may be made without departing from the essential spirit and scope of the invention. It is intended to include all such variations and modifications.

I claim:

1. A fluidized bed process heater comprising a vessel of toroidal configuration having an outer wall and a generally concentric inner wall, a horizontal annular constriction plate extending between said outer and inner walls and separating a heater chamber in the upper portion of said vessel from a windbox occupying the lower portion of said vessel, said constriction plate being capable of supporting a fluidized bed of particulate solids thereon, a plurality of heat exchanger coil units within said vessel, said coil units each having a planar serpentine tube element composed of horizontal runs of tubing serially joined by return bends, the horizontal runs of tubing of each coil unit extending inwardly through the fluidized bed region of said heater chamber along a radius of said vessel with the plane of said coil unit in vertical orientation, means removably supporting said coil units at said outer wall, recess means mounted on said inner wall in said heater chamber in supporting contact with those return bends of said coil units proximate said inner wall, said recess means shielding the supported return bends from the erosive conditions prevailing in said heater chamber.

2. The process heater of claim 1 wherein said coil unit includes a hatch member to which said serpentine tube element is secured and wherein said hatch member is removably fixed to said outer wall.

3. The process heater of claim 2 wherein said horizontal runs of tubing pass through said hatch member so that said return bends adjacent said hatch member are located outside said heater chamber.

4. The process heater of claim 3 wherein said recess means at said inner wall comprises a plurality of horizontal support rings surrounding said inner wall within said heater chamber at elevations corresponding to the elevation of return bends of said serpentine tube element, adjacent support rings forming protective recesses at said inner wall, said return bends adjacent said inner wall each being supported by one of said annular support rings in one of said protective recesses.

5. The process heater of claim 1 wherein said inner wall is in cooling contact with cooling coils.

6. The process heater of claim 5 wherein said coil unit includes a hatch member to which said serpentine tube element is secured and wherein said hatch member is removably fixed to said outer wall.

7. The process heater of claim 6 wherein said horizontal runs of tubing pass through said hatch member so that said return bends adjacent said hatch member are located outside said heater chamber.

8. The process heater of claim 7 wherein a plurality of horizontal support rings surround said inner wall within said heater chamber at elevations corresponding to the elevation of return bends of said serpentine tube element, said return bends adjacent said inner wall each being supported by one of said annular support rings.

9. The process heater of claim 8 wherein a serpentine coil heat exchange unit is provided in the freeboard region of the heater chamber.

10. A fluidized bed process heater comprising a vessel of toroidal configuration having an outer wall and a generally concentric inner wall, a horizontal annular constriction plate extending between said outer and inner walls and separating a heater chamber in the upper portion of said vessel from a windbox occupying the lower portion of said vessel, said constriction plate being capable of supporting a fluidized bed of particulate solids thereon, a plurality of heat exchanger coil units within said vessel each comprising horizontal runs of tubing extending inwardly through the fluidized bed region of said heater chamber along a radius of said vessel, said horizontal runs of tubing of each of said coil units being arranged one above the other and joined at the ends thereof by vertically positioned return bends, the return bends adjacent said outer wall being outside said outer wall and the return bends adjacent said inner wall being supported in said heater chamber in recesses provided in said inner wall whereby said inner return bends are supported within said heater chamber and protected from the erosive environment therein.

11. The fluidized bed process heater of claim 10 wherein a plurality of fuel guns are positioned to inject fuel into said fluidized bed region between selected adjacent coil units.

* * * * *